United States Patent Office 3,493,887
Patented Feb. 3, 1970

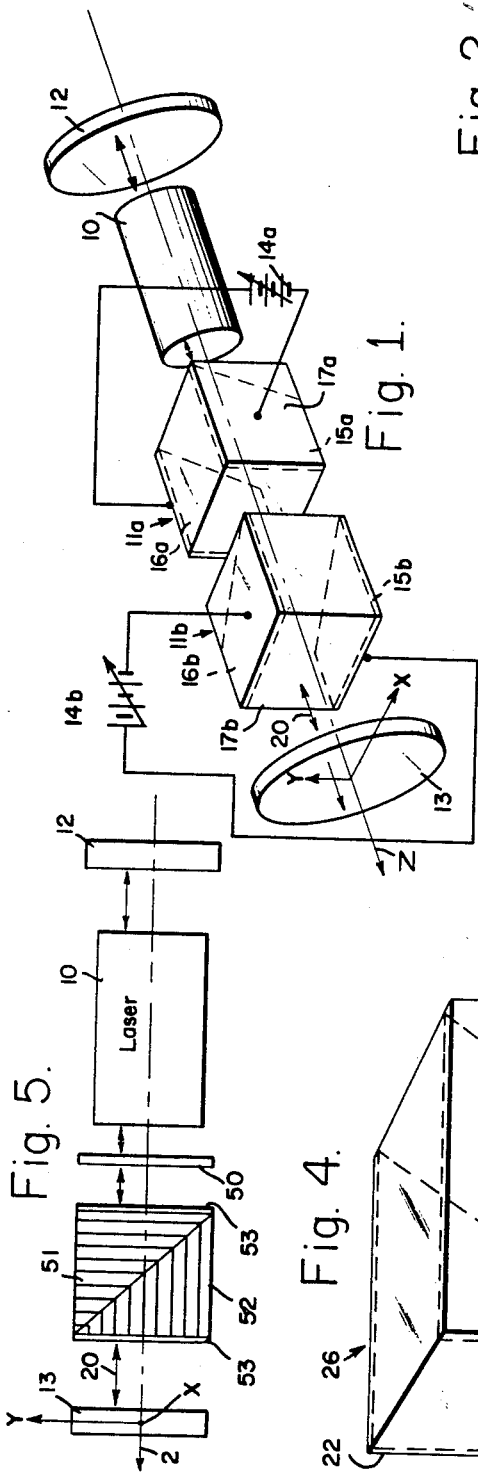
Feb. 3, 1970   U. J. SCHMIDT ET AL   3,493,887
LASER CAVITY FOR SELECTIVELY DEFLECTING
THE OUTPUT BEAM PARALLEL TO ITS AXIS
Filed Dec. 16, 1966
Roy E. Jones,
Uwe J. Schmidt,
INVENTORS.
BY.
AGENT.

3,493,887
LASER CAVITY FOR SELECTIVELY DEFLECTING THE OUTPUT BEAM PARALLEL TO ITS AXIS
Uwe J. Schmidt, Pinneberg, Germany, and Roy E. Jones, Hanover, N.H., assignors to TRW Inc., Redondo Beach, Calif., a corporation of Ohio
Filed Dec. 16, 1966, Ser. No. 602,259
Int. Cl. H01s 3/05
U.S. Cl. 331—94.5    9 Claims

ABSTRACT OF THE DISCLOSURE

This invention pertains to a laser cavity wherein a beam of coherent electromagnetic radiation is controllably transposed along parallel paths and more particularly to a laser cavity wherein a birefringent material having a graduated length which, under the influence of electrical stress, provides the laser cavity with variable graduated optical path lengths. The beam will form and be transposed along the optical path which corresponds to the resonant path of the cavity. It is thereby possible to control the path of the beam by spoiling the Q of the cavity along all paths other than the desired path.

---

In the prior art, various types of laser cavity oscillators have been developed which operate in the optical and infrared frequency ranges. For the purposes of the present application, the expression "optical frequency radiation" is intended to define the electromagnetic band from the farthest infrared to the ultraviolet and encompassing the general wavelength range from about $2 \times |-|:10^5$ angstroms to about 200 angstroms. The term "optical," as used in the present application, is to be understood as meaning electromagnetic radiation having substantially any wavelength within that range.

With the advent of laser beam systems, a need has arisen for high speed deflecting devices that can deflect these laser beams along desired paths. One of the many existing needs, e.g., is in the field of information storage and readout mechanisms for computer systems wherein the position of the beam indicates a bit of information or wherein an analog input controls the position of the beam and this position within a gridded area is read out as a digital integer.

A prior art high-speed angular deflection device is disclosed in U.S. Patent application No. 343,623, entitled "Electromagnetic Radiation Beam Directing Systems," filed Feb. 10, 1964 by F. R. Marshall and assigned to TRW, Inc., the assignee of the present invention. In that patent application, concave spherical reflectors define a resonant optical cavity. The active laser material, which may be a ruby rod, is provided with spherically ground integral lenses at its axial ends. The concave spherical reflectors are spherical about the center of the ruby rod. A concave spherical birefringent element is placed in the optical cavity between one end of the ruby rod and a concave spherical reflector. The birefringent element is activated with an electrical signal which controls the polarization of the light from the ruby rod so that when the light is reflected back through the birefringent element, it is plane polarized in the preferred polarization plane of the ruby rod, thereby providing maximum amplification. Because the polarization angle also varies as a function of angle between the beam path and the optical axis of the birefringent material, there will be only one unique path which will provide the required polarization angle (phase shift) which will sustain oscillations in the ruby rod.

One of the manufacturing difficulties present in concave spherical reflector type devices is the accurate forming of the concave spherical reflectors, the spherically ground integral lenses of the laser material, and the concave spherical birefringent element. The present invention overcomes the foregoing difficulty by utilizing parallel optically flat surface reflectors, flat-ended laser material and a variable cavity resonator means which effectively spoils the optically resonant cavity along all but desired parallel paths. Variation in the control voltage across the variable cavity resonator means provides a parallel shift in the non-Q-spoiled path.

In the prior art devices, it is necessary to provide the active laser material with a geometry having a relatively large diameter or thickness as compared to its length, because the light beam is angularly displaced in the active material. Gas type lasers are generally much longer than they are wide; therefore, the amount of angular deflection possible with a prior art gas type laser is limited. The present invention has the distinct advantage in that it can be used with any length laser because the beam is displaced along paths substantially parallel to the length of the laser.

Accordingly, it is a primary object of the present invention to provide a novel dirigible laser cavity.

It is another object of the present invention to provide a laser cavity wherein the light beam is controllably displaced along substantially parallel paths.

It is a further object of the present invention to provide a laser cavity which utilizes a means for controllably spoiling the Q of a laser cavity along all but a desired path.

In a preferred form of the present invention, the foregoing objects are achieved by utilizing a variable cavity resonator means for providing the laser cavity with graduated parallel optical path lengths at a given value of control voltage. A beam-like mode of optical frequency oscillation will be supported only along that optical path length which is equivalent to the resonant frequency of the laser cavity. A change in the value of the control voltage causes a parallel shift in the position of the resonant optical path length, which in turn transposes the path of the beam.

The aforementioned and other objects of the present invention will become more apparent when taken in conjunction with the following description and drawings in which:

FIGURE 1 illustrates the preferred embodiment of the present invention;

FIGURE 2 illustrates another graduated device which may be used in the present invention;

FIGURE 3 is a graph illustrating a property of the device of FIGURE 2;

FIGURE 4 illustrates a device for achieving graduated optical path lengths; and

FIGURE 5 illustrates a second embodiment of the present invention.

Referring to FIGURE 1, the laser cavity comprises an active laser material in the form of a cylindrical ruby rod 10 which is disposed within a resonant optical cavity which is defined by the optically flat reflective members 12 and 13. The longitudinal axis of symmetry of the cylindrical ruby rod 10 defines the central axis z. The reflector members have their optically flat surfaces positioned in the y–x plane which is normal to the z axis facing one another from opposite ends of the axis.

Preferably, the end reflector 12 is made fully reflecting by provision of appropriate dielectric coatings on the inner surface thereof in accordance with a practice which is now well known in the art. The other reflector 13 is partially transmitting so that an output laser beam may be propagated outwardly therefrom as indicated by the reference numeral 20.

A variable cavity resonator means 11, which may be electro-optic type devices such as Kerr cells, is positioned within the resonant optical cavity between the active laser material and one of the end reflectors. Kerr cells 11a and 11b are shown as the variable resonator means but it should be understood that various electro-optic arrangements will become apparent to persons skilled in the art after they fully appreciate the concept of controlling the position of oscillations within a resonant optical cavity. Each of the Kerr cells is identical in construction with like parts designated a for one cell and b for the other cell. The Kerr cells 11 have transparent containers 17 which hold a dielectric liquid such as nitrobenzol 21. Trapezoidal electrodes 15 and 16 are positioned inside and on opposite walls of the transparent containers in contact with the nitrobenzol 21. A variable potential source 14 is connected across the electrodes. The electrodes 16a and 17a are positioned parallel to the Y-axis, and electrodes 15b and 16b are positioned parallel to the X-axis.

The variable cavity resonator means 11 make use of the fact that the optical path length of a Kerr cell can be varied not only by an applied potential but also by the geometrical shape of the Kerr cell and/or the electrodes as well. In 11a, a fixed value of potential from source 14a will create a graduated optical path length through the cell which increases in the Y direction of the X-Y plane of reflector 13. Assuming for the moment that Kerr cell 11b were not in the cavity and that the graduated optical path length across the end faces of Kerr cell 11a contained one value of optical length which corresponds to the resonant frequency of the cavity, causing oscillation and light amplification in the laser material 10 along a plane parallel to the X-Z plane. By increasing or decreasing the potential from source 14a, the plane in which the oscillations take place can be made to move up or down along the Y-axis. Kerr cell 11b operates in a similar fashion in the Y-Z plane to create a beam which can be controllably positioned to any desired point in the X-Y plane. For a full and complete understanding of the manner in which the beam is transposed, it is desirable to consider briefly the polarization characteristics of the coherent optical energy emitted by laser elements such as the ruby rod 10.

It is well known in the art that pink ruby of the type commonly used for lasers is an optically anisotropic material having a cross-section for absorption which varies as a function of the polarization of the impinging radiation. That is, a plane polarized wave passing through the ruby rod at one specific polarization angle relative to the crystal structure will encounter a maximum absorption, and a plane polarized wave traveling in the same direction but polarized at a different angle will encounter a minimum absorption. It is also well known that a pumped or population inverted ruby will have a minimum amplification or gain for plane polarized waves having a first angular orientation and a maximum gain for a second orientation. Therefore, the ruby rod tends to produce a dominant oscillatory wave which is plane polarized in the preferred plane of the crystal structure of the ruby which eliminates the requirement for a polarizer in the resonant cavity. If the optic axis of Kerr cells 11a and 11b are positioned perpendicular to the optic axis z of the laser material, the plane polarized wave from the laser material is not divided or separated into the well-known ordinary and extraordinary waves, but instead the extraordinary and ordinary waves traverse the same path but at different speeds. This different speed causes a delay or retardation in a relative phase of the waves by an amount $\phi$ which is defined by the equation:

$$\phi = K_e L \frac{V^2}{d} \quad (1)$$

where $K_e$ = Kerr's constant, $d$ = electrode gap, $V$ = voltage, and $L$ = length of the Kerr electrodes.

From Equation 1 it may be seen that the phase shift $\phi$ may be varied by varying the potential V and/or varying the length L of the electrodes. If the optic axis of the Kerr cells 11a and 11b are not positioned perpendicular to the optic axis Z of the active laser material, then the plane polarized wave from the laser material will be separated into ordinary and extraordinary rays. The amount of separation encountered is generally small and can be neglected in the operating theory of the device. Because of the square law response of the Kerr cells to an applied voltage, it is necessary, in order to get a phase shift which moves linearly in time across the cell face, to either apply an exponential voltage to the electrodes or shape the electrodes such that L varies in a non-linear manner. Referring to FIGURE 2, the electrode 19 is curved to provide the desired linear response. The amount of curvature is expressed by the formula:

$$L = K \frac{1}{V^2} \quad (2)$$

where K is a constant. The potential V has to be expressed as a function of time $t$ (or is determined by the potential source) and $t$, then, is replaced by the local coordinate Y, which moves across the face of the electrode (Kerr cell). Then, $t = aY + b$. Substituting this value of $t$ into Equation 2, we obtain:

$$L = K \frac{1}{[V(aY+b)]^2} \quad (3)$$

where $a$ and $b$ are suitable constants.

In FIGURE 3, the curve 30 illustrates the amount of light transmissions across the faces of a linear type Kerr cell utilizing the electrode shape of FIGURE 2. A change in the shape of the electrode will change the shape of the curve or, in other words, the Q of the laser cavity can be changed by changing the shape of the electrodes in the Kerr cells.

Referring now to FIGURE 4, a Kerr cell 26 is shown comprised of a transparent container 24 filled with nitrobenzol 21, rectangular electrodes 22 and 25, and a prism 23 made of an isotropic material such as glass having the same index of refraction as that of the nitrobenzol 21. The triangular prism 23 effectively changes the length of the Kerr cell by varying the amount of Kerr liquid that will be seen by a beam traversing the face of the cell from left to right.

In FIGURE 5, the variable cavity resonator means is comprised of a modified Pockels cell 51. The Pockels material 52, such as crystal, is formed in the shape of a right polyhedron. An isotropic material 51 is formed also in the shape of a right polyhedron and is placed in contact with the Pockels material to form jointly a parallelepiped bisected by the junction of the two materials. Transparent electrodes 53 are placed one on the Pockels material and one on the isotropic material. Because the electrodes are in the optical field of the laser cavity, which is defined by reflectors 12 and 13, the electrodes must be transparent. A transparent electrically conducting material such as Nesa glass may be used for the electrodes or a metal coating or sheet having transparent windows may be used. A potential source (not shown), but which may be similar to potential sources 14a and 14b, may be provided for varying the potential across the electrodes, thereby varying the graduated optical path length across the face of the cell, displacing the optical beam 20 along and perpendicular to the Y axis. A linear polarizer 50 is inserted between the cell 51 and the laser material 10 or between the cell and the nearest reflector when the optical energy from the laser material is not inherently polarized. In general, polarization will not occur for lasers made of gases and liquids. A second modified Pockels cell, identical to cell 51, may be inserted in the optical cavity to provide an axis of displacement along the Y direction in a similar manner as disclosed in the device of FIGURE 1. It is also possible to keep the laser cavity in a Q-spoiled state when no potential is applied to the variable cavity resonator means by inserting a birefringent crystal plate in the cavity—the optical path length of the plate being just sufficient in length to provide a Q-spoiled condition across the entire optical cavity.

A divergent lens may be placed outside the cavity parrallel to reflector 13 to provide angular displacement of the formed optical beam 20.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. A laser for selectively deflecting the light beam along its main axis comprising:
   (a) a laserable material extending along a main axis and including means for generating a linearly polarized coherent beam of light;
   (b) means including a pair of parallel light reflectors enclosing said laserable material and defining a resonant optical cavity of predetermined length; and
   (c) means for continuously varying the optical path length across a cross-section of said laserable material through said main axis and including:
   (d) a birefringent material having an active cross-section along said major axis of substantially trapezoidal shape; and
   (e) electric means coupled to said birefringent material for continuously varying the optical path length through said birefringent material, whereby said laserable material is capable of generating a coherent beam of light only within a predetermined portion of its cross-section.

2. A laser as defined in claim 1 wherein said birefringent material is provided with substantially trapezoidal electrodes coupled to said electric means for varying the optical path length through said birefringent material in accordance with the potential applied thereto.

3. A laser as defined in claim 1 wherein said birefringent material has the shape of a polyhedron having a substantially trapezoidal cross-section along said main axis, whereby the optical path length therethrough is varied in a continuous manner by varying an electric potential applied thereto by said electric means.

4. A laser as defined in claim 1 wherein said means for continuously varying the optical path length consists of a first cell of a first birefringent material having an active cross-section in a first plane along said major axis of substantially trapezoidal shape and means for applying an electric potential thereto for continuously varying the optical path length through said first birefringent material, and a second cell of a second birefringent material having a substantially trapezoidal shape extending in a second plane at right angles to said first plane and means for applying a variable potential to said second cell for varying the optical path length therethrough in a said second plane, whereby said light beam may be deflected in two directions at right angles to each other and parallel to said main axis.

5. A laser as defined in claim 4 wherein said birefringent material is a liquid.

6. A laser as defined in claim 4 wherein said birefringent material is a crystal exhibiting the Pockets effect.

7. A laser for selectively and continuously deflecting the light beam along its main axis comprising:
   (a) a laserable material extending along a main axis and including means for generating a linearly polarized coherent beam of light;
   (b) means defining a resonant optical cavity of predetermined length and including a pair of parallel light reflectors enclosing said laserable material;
   (c) means interposed in said resonant cavity and having a cross-section no less than that of said laserable material and including a birefringent material having an active portion of substantially trapezoidal cross-section along said main axis for continuously controlling at will the optical path length therethrough; and
   (d) electrical means coupled to said birefringent material for applying a variable potential thereto, thereby to provide a path length through a cross-sectional area along said main axis permitting the generation of a coherent beam of light.

8. A laser as defined in claim 7 wherein said birefringent material has a polyhedral shape for providing different optical path lengths for each path parallel to said main axis.

9. A laser as defined in claim 7 wherein said birefringent material consists of a substantially transparent container substantially filled with a birefringent liquid, and trapezoidal electrodes in contact with said liquid positioned parallel to said main axis for applying to said liquid a variable potential for varying at will continuously the length of the optical path parallel to said main axis.

References Cited

UNITED STATES PATENTS 3,339,151   8/1967   Smith _____ 331—94.5

RONALD L. WIBERT, Primary Examiner

PAUL K. GODWIN, Jr., Assistant Examiner

U.S. Cl. X.R.

250—199; 350—150, 160